United States Patent Office 3,368,976
Patented Feb. 13, 1968

3,368,976
INSULATING COMPOSITIONS CONTAINING
HEAT TEMPERED ESSENTIALLY MONT-
MORILLONITE-FREE KAOLIN
Robert F. Conley, Elizabeth, N.J., assignor to Georgia
Kaolin Company, Elizabeth, N.J., a corporation of
New Jersey
No Drawing. Continuation-in-part of application Ser. No.
373,832, June 9, 1964. This application Feb. 18, 1966,
Ser. No. 528,407
2 Claims. (Cl. 252—63.5)

This application is a continuation-in-part of copending application Ser. No. 373,832, filed on June 9, 1964, by Robert F. Conley.

This invention relates to the production of electrical insulating compositions containing kaolin which has been subjected to tempering conditions below those employed for mullite formation. More specifically, it deals with the use of essentially montmorillonite-free powdered kaolin of low dielectric constant and dissipation factor and relatively low abrasiveness, in electrical insulating compositions and to the process of making such compositions.

In recent years, the electronics industry has exhibited considerable interest in electrical grade filler materials, particularly in the production of lower cost plastic molding formulations, and in the use of lower cost powdered fillers having low dielectric constant and low dissipation factors. The dissipation factor is essentially a measure of the electrical energy consumed in a body (as heat) due to the motion of charges and dipolar materials in said body, when the latter is subjected to an electrical field. Typical formulations of interest to the industry range from rigid castings, e.g., those incorporating phenolic structural components, to flexible extrusions, as exemplified by vinyl and butyl wire insulation.

Kaolin is an aluminum silicate having the formula $Al_2Si_2O_5(OH)_4$. It has been used, as such, to some minor extent in special electrical formulations where dielectric characteristics are not of particular importance. However, it possesses a major disadvantage in that it contains bound water of hydration which gives it a high dielectric constant of about 2.5, and a high dissipation factor of about 0.16. As a result, undesirable power losses ensue if such material were employed as a high load filler in a plastic insulator body. Unfortunately, if it were not for these adverse electrical characteristics, kaolin would make an excellent low cost filler for electrical insulating compositions. And, for this reason, its use in such outlets has been greatly restricted.

The water of hydration of kaolin can be removed by heating, so that all of the water may be driven off by the time a temperature of 50° to 600° is reached. By further heating to about 1000° C., recrystallization of the kaolin occurs, and it becomes converted to mullite, $Al_6Si_2O_{13}$, a material having good electrical properties, which can be used as an electrical grade filler. However, due to the high heat requirements encountered in the production of mullite, its cost is considerably more than that of kaolin.

Another factor to be considered is abrasiveness. As the temperature of treatment of kaolin is increased, its abrasiveness increases, and this characteristic causes increased wear on roll mills and other processing equipment. Powdered mullite is a very abrasive material. The abrasiveness characteristic of kaolin rises quite rapidly when temperatures above 850° C. are employed, as is apparent from the following data:

| Calcination temperature, °C.: | Abrasive index |
|---|---|
| 25 | (approx.) 0 |
| 550 | 4 |
| 650 | 8.5 |
| 750 | 12 |
| 850 | 22.5 |
| 950 | 37.5 |
| 1000 (mullite) | 42 |

The abrasive index is based on the Valley abrasion meter, the reading units being mg. std. Cu loss/100 g. clay. The values given are averages of two data determinations.

It is common practice to move powdered clay around a plant, for processing and shipping, in the form of an aqueous slurry. Thus, in commercial operation, kaolin is transferred around a plant, through pumps and pipes, in the form of an aqueous slurry, usually containing some sodium hexametaphosphate which imparts to the slurry a dispersed character.

According to the present invention, it has been found possible to produce from powdered kaolin an excellent filler useful for making electrical insulating compositions of low dielectric constant and low dissipation factor, i.e., with values in the neighborhood of about 1.25–1.30, and 0.005–0.020, respectively. This is achieved not by calcining to the mullite stage, but rather by subjecting the kaolin to a "tempering" heating range of 700° C. to 800° C. The heating is carried out in this range until the desired electrical characteristics (dielectric constant and dissipation factor) remain substantially constant. This temperature is well above the complete dehydration temperature range of kaolin, but is still in a heating range wherein the abrasiveness of the kaolin has not reached an excessively high value. The tempered clay then is air annealed by allowing it to cool in air to ambient temperature.

Unfortunately, in the processing of the thus-tempered kaolin, it has been found that such tempered kaolin is susceptible to degradation by contact with liquid water, and more particularly and more seriously, by contact with liquid water containing slurrying chemicals. It is thus very important that liquid water, and particularly, water containing slurrying chemicals, be kept away from this material.

It has been found that the presence of montmorillonite in amounts of a few percent or up to above 5% by weight, tends to exaggerate the damaging effect of water-quenching, so that it is desirable to use an essentially montmorillonite-free kaolin by keeping down the montmorillonite concentration to below about 1% by weight of the dry kaolin.

The invention will be more readily understood by reference to the following examples which illustrate some of the features involved:

*Example 1*

A sample of fractionated, essentially montmorillonite-free Georgia kaolin, containing less than 1% by weight of montmorillonite and having an average particle size of approximately four microns, was subjected to heating at various temperatures, and the dielectric properties of the resulting product were measured. Table I lists the results obtained. Although breakdown voltage data are included in the table, this property is not a binding criterion for insulating composition evaluation.

similarly water-quenched, then acidulated with sulfuric acid to pH 3.7, filtered, washed and dried at 125° C. All samples were air-annealed prior to measurement of

TABLE I

| Sample | T° C. | Treatment | Dielectric Constant | Dissipation Factor | Breakdown Voltage (v./mil) |
|---|---|---|---|---|---|
| A | 25 | As received | 2.62 | 0.16 | 121 |
| B | 125 | Oven dried at 125° C. | 2.46 | 0.15 | 70 |
| C | 640 | Calcined, air annealed. | 1.38 | 0.037 | 69 |
| D | 690 | ....do | 1.34 | 0.024 | 77 |
| E | 750 | ....do | 1.32 | 0.011 | 104 |
| F | 800 | ....do | 1.32 | 0.011 | 75 |
| G | 860 | ....do | 1.30 | 0.010 | 101 |
| H | 1,000 | ....do | 1.31 | 0.070 | 82 |

It will be observed from Table I that, although complete dehydration of the kaolin takes place at about 600° C., the dissipation factor begins to drop below about 0.025 at about 690° C. However, at the mullite formation temperature of 1000° C., the dissipation factor increases considerably. Apparently, the recrystallization involved results in a marked change in surface properties, as well as internal stress. Although the dissipation factor at 860° C. (Sample G) is good, there is a considerable increase in abrasiveness of the product in this range.

The dielectric constant and dissipation factor were determined in accordance with ASTM method D150-59T at 1000 c.p.s. by the disc technique. Results quoted are based on an average of two determinations. Breakdown voltage was measured at 60 cycles per second on a 1⅜" diameter 25 gram compressed disc (242 p.s.i.). Results quoted are an average of five determinations. Because relative humidity profoundly affects this test, all samples were run between 20% and 40% R.H.

*Example 2*

A portion of Sample E from Example 1 was taken (after cooling) and subjected to conventional slurrying procedure for movement through a plant. This standard slurrying operation involves mixing the kaolin with water containing sodium hexametaphosphate, pumping to filtering equipment, flocculating with sulfuric acid to a pH of 3.7, filtering, washing and drying at 125° C. This dried sample was designated Sample I, and electrical tests thereon were made and compared with those of Sample E in Example 1, as is apparent from Table II.

TABLE II

| Sample | Dielectric Constant | Dissipation Factor | Breakdown Voltage (v./mil) |
|---|---|---|---|
| E | 1.32 | 0.011 | 104 |
| I | 1.35 | 0.021 | 76 |

From Table II, it becomes apparent that conventional slurrying of the kaolin almost doubles the dissipation factor and makes the product unsuitable for electrical insulating compositions of high quality.

*Example 3*

Another kaolin similar in composition to Sample A, but slightly coarser, was heat tempered at 750° C. and then divided into three fractions (J, K, L) which were processed as follows:

Sample J was calcined at 750° C. and air-annealed by cooling to room temperature.

Sample K was similarly heat tempered and water-quenched (by dumping into tap water, free of added chemicals), and then dried at 125° C.

Sample L was similarly heat tempered at 750° C., their electrical properties the latter being reported in Table III.

TABLE III

| Sample | T° C. | Dielectric Constant | Dissipation Factor | Breakdown Voltage (v./mil) |
|---|---|---|---|---|
| J | 750 | 1.28 | 0.006 | 69 |
| K | 750 | 1.32 | 0.008 | 72 |
| L | 750 | 1.32 | 0.020 | 79 |

Sample L in Table III is similar to Sample I in Table II. It will be noted that water does affect detrimentally the electrical characteristics of the tempered kaolin, but its effect is nowhere near the damage done by water plus slurrying chemicals, as shown in Table II.

*Example 4*

A sample of smaller average particle size kaolin containing a naturally-occurring small amount of montmorillonite (about 5%), was heated to a tempering heat of 750° C., similarly to Sample E, and then divided into three fractions (Samples M, N and O). Sample M was air-annealed. Sample N was water-quenched, and dried at 125° C. (and air-annealed), and Sample O was air-annealed, acidulated, filtered, washed and dried (as samples I and L) (and air-annealed). Electrical tests were obtained on the samples, and the results are given in Table IV.

TABLE IV

| Sample | Dielectric Constant | Dissipation Factor | Breakdown Voltage (v./mil) |
|---|---|---|---|
| M | 1.32 | 0.030 | 81 |
| N | 1.37 | 0.083 | 106 |
| O | 1.91 | 0.27 | 77 |

From Table IV it is apparent that if a small amount of montmorillonite is present in the kaolin, the small amount of the montmorillonite exaggerates the damaging effect of water-quenching, so that it is desirable to keep the montmorillonite content as low as possible, preferably below about 1% by weight.

Although the water causes more deterioration in electrical properties than in the case of essentially montmorillonite-free kaolin, the very damaging effect by slurrying chemicals is apparent in this case.

From the aforesaid, it is noted that kaolin with exceptionally good electrical characteristics and with minimum abrasiveness may be produced by heating the kaolin to a tempering heat of 700° C. to 800° C., and then air-annealing the clay and avoiding contact with liquid water, and particularly with aqueous slurrying solutions.

The tempered kaolin of the present invention may be added as a filler to plastic insulating compositions, in amounts of about 1.0% to about 10%, or 30% to 40%, and even 50%, or even up to 80% or more by weight, depending upon the formulation requirement. Examples of such formations are as follows:

Example 5

A phenolic casting insulating resin is prepared by mixing the following ingredients:

| | Parts by wt. |
|---|---|
| Electrical grade phenol-formaldehyde molding resin | 105 |
| Denatured alcohol | 200 |
| Tempered kaolin (essentially montmorillonite-free) | 195 |

The mixture is milled, then heated until the alcohol is evaporated, and then molded at about 450° F., under high pressure. The aforesaid composition gives insulating properties at least as equal to those having conventional insulating fillers in lieu of the tempered kaolin.

Example 6

A flexible vinyl insulation is prepared by mixing the following ingredients:

| | Parts by wt. |
|---|---|
| Electrical grade polyvinyl chloride | 60 |
| Dioctyle phthalate plasticizer | 40 |
| Basic lead silicate-silica gel complex | 5 |
| Tempered kaolin (essentially montmorillonite-free) | 10 |

The mixture is hot-milled and extruded at 320° F. Its electrical insulating performance is at least equal to that obtained with similar compositions containing conventional insulating fillers.

Example 7

A flexible butyl wire insulation is prepared by mixing the following ingredients:

| | Parts by wt. |
|---|---|
| Butyl resin, wire insulation grade | 100 |
| N-methyl-N-4-dinitrosoaniline | 1 |
| Stearic acid | 1 |
| Tempered kaolin (essentially montmorillonite-free) | 60 |
| Carbon black | 40 |
| Zinc oxide | 5 |

*Example 7—Continued*

| | |
|---|---|
| Antitack wax | 5 |
| N-N'-bis-1-ethyl-3-methylpentyl-p-phenylenediamine | 1.2 |
| Sulfur | 2 |
| Benzothiazyl disulfide | 1 |
| Zinc dibenzyldithiocarbamate | 1.5 |
| Zinc dibutyldithiocarbamate | 1 |

The mixture is milled and extruded at 320° F. The electrical performance of this mixture is equal to similar conventional electrical insulating compositions.

I claim:

1. An electrical insulating composition of low dielectric constant, low dissipation factor, and involving low abrasiveness, consisting essentially of an insulating synthetic organic resin compound and an amount of 1% to 80%, by weight, of a powdered kaolin containing less than about 1%, by weight based on the kaolin, of montmorillonite, and which has been heat-tempered at about 700° C. to about 800° C., air annealed, and processed in the absence of water with or without slurrying chemicals.

2. A process for producing an electrical insulating composition of low dielectric constant, low dissipation factor, and involving low abrasiveness, consisting essentially of heating a powdered kaolin containing less than about 1%, by weight, of montmorillonite, to a tempering temperature of about 700° C. to about 800° C. until the aforesaid electrical characteristics thereof remain substantially constant, and without subsequent contact with water with or without slurrying chemicals, air-annealing said tempered product, and thereafter incorporating said annealed product as a filler in an amount from 1% to 80%, by weight, into a synthetic organic resin insulating compound.

References Cited

UNITED STATES PATENTS 2,632,752  3/1953  Anderson _____ 260—40
2,757,160  7/1956  Anderson _____ 260—40

LEON D. ROSDOL, *Primary Examiner.*

J. D. WELSH, *Assistant Examiner.*